July 26, 1927.
T. M. THOMPSON
1,636,929
AGRICULTURAL MACHINE
Filed March 31, 1926
3 Sheets-Sheet 3
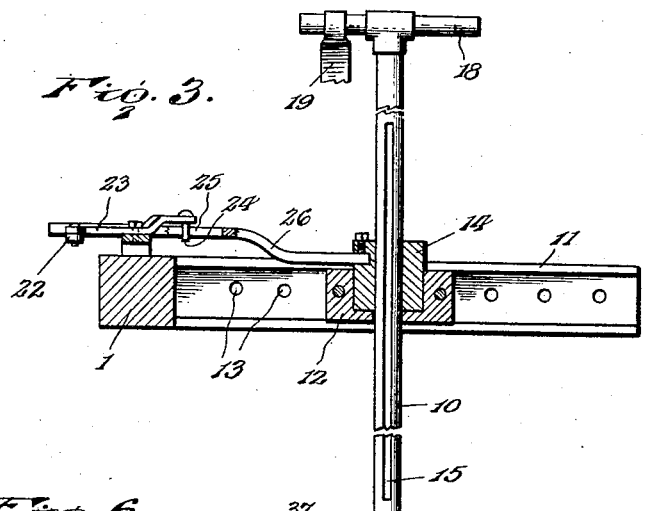
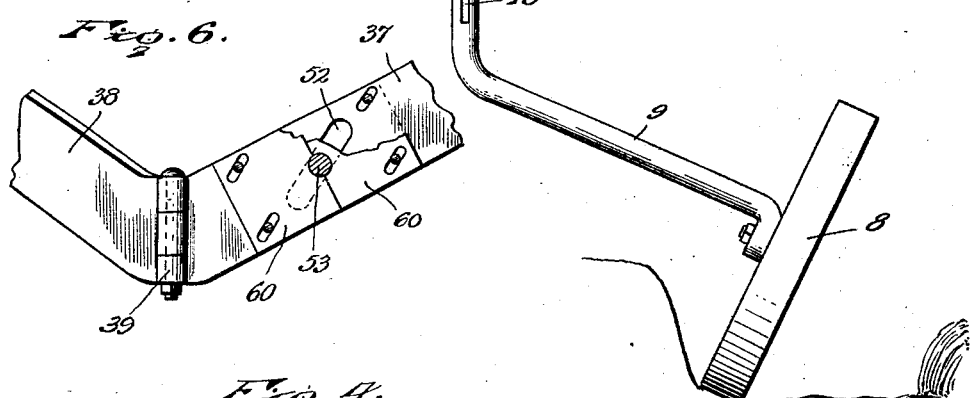
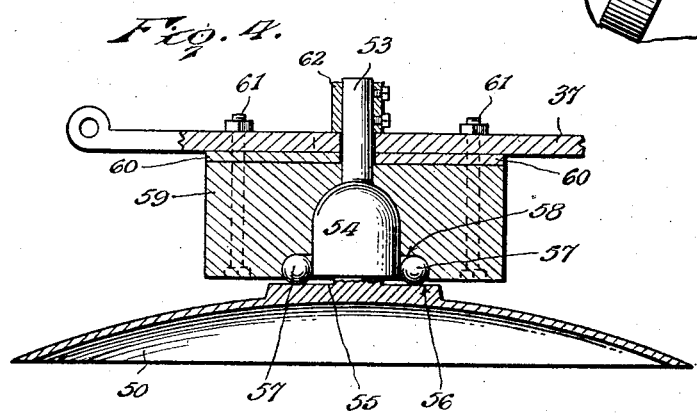
Inventor
T. M. Thompson.
By Lacey & Lacey Attorneys Patented July 26, 1927.

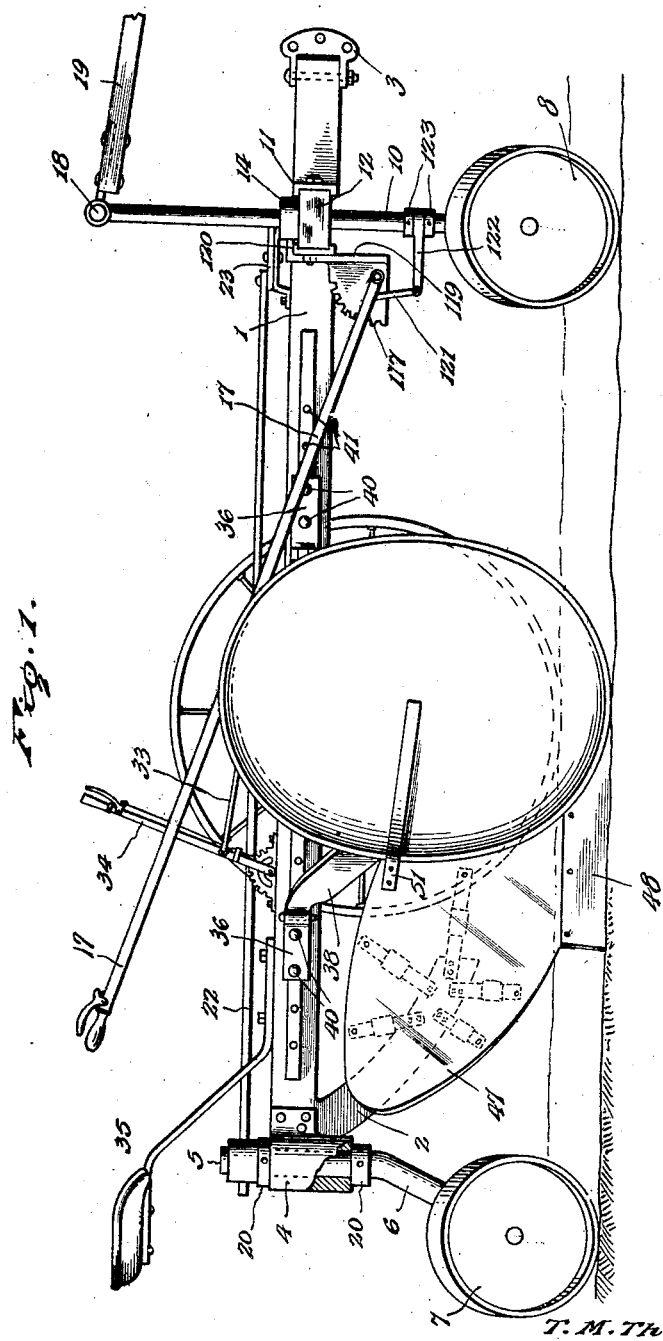

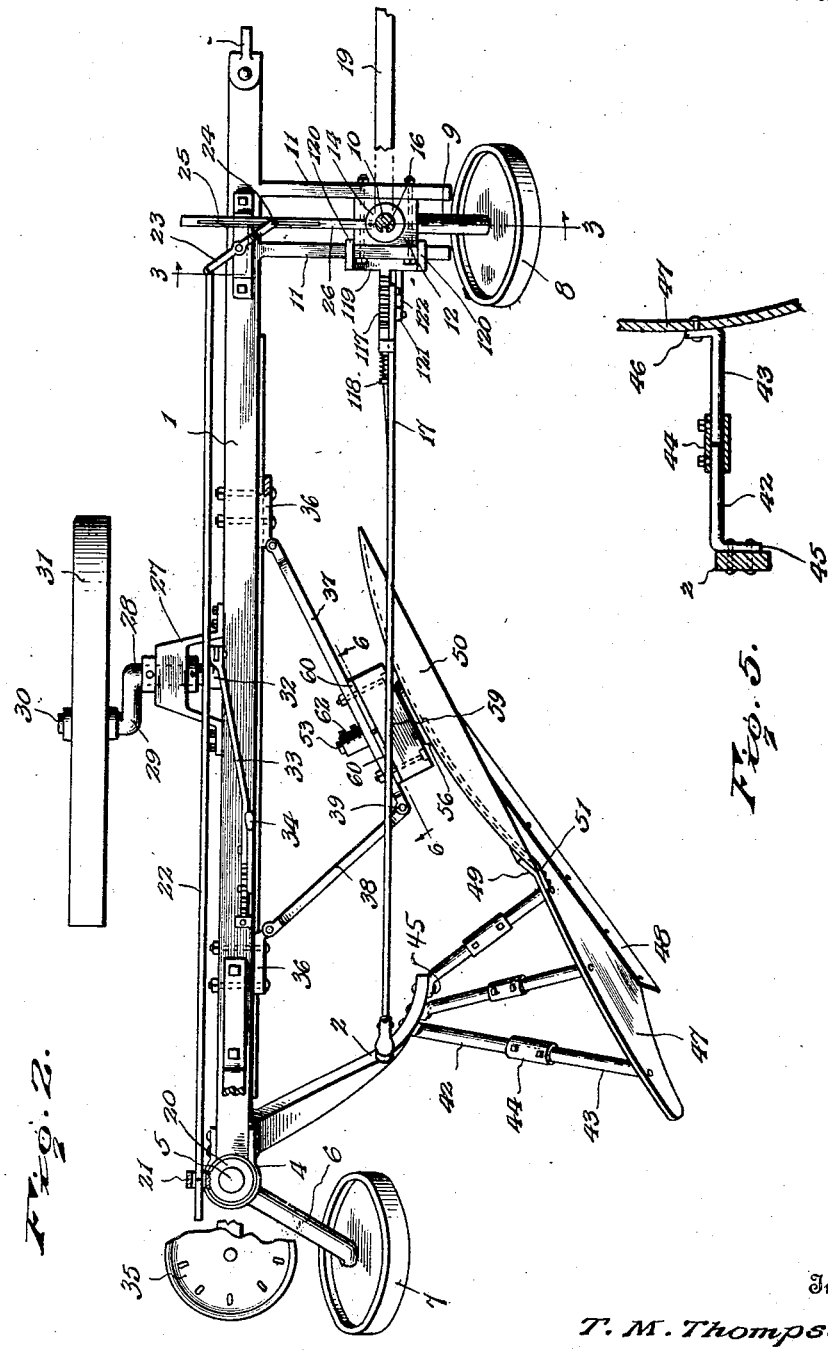

1,636,929

UNITED STATES PATENT OFFICE.

THOMAS M. THOMPSON, OF GREAT FALLS, MONTANA, ASSIGNOR OF ONE-HALF TO ARCHIE B. WILSON, OF GREAT FALLS, MONTANA.

AGRICULTURAL MACHINE.

Application filed March 31, 1926. Serial No. 98,876.

This invention relates to agricultural machines and has more particular reference to means for preparing the soil for planting, the object of the invention being to provide a machine which will utilize all the advantages of both a disk plow and a breaking and turning plow, and which will be of light draft and so constructed that it will easily follow a formed furrow while forming a second furrow. Other objects of the invention will incidentally appear in the course of the following description, and the invention resides in certain novel features which will be hereinafter first fully described and then more particularly pointed out in the appended claims.

In the drawings:

Figure 1 is a side elevation of a machine embodying my present invention;

Fig. 2 is a top plan view of the same;

Fig. 3 is an enlarged vertical section on the line 3—3 of Fig. 2;

Fig. 4 is an enlarged section through the disk and the support of the same;

Fig. 5 is a detail sectional view showing the connection between the standard and the moldboard, and Fig. 6 is a detail of a portion of the mounting of the disk with parts in section on the line 6—6 of Fig. 2.

In carrying out the present invention, there is provided a beam 1 which has its rear end turned downwardly, forwardly and outwardly, as shown at 2, whereby to constitute a standard to which a moldboard may be secured. The front end of the beam carries a clevis 3 for the application of draft and at the rear end of the beam is secured a vertical sleeve or bearing 4. Fitted rotatably in the said sleeve 4 is a stem 5 having its lower end portion carried laterally, as shown at 6, and supporting a rear furrow wheel 7 which is adapted to run in the furrow, produced by the ground-engaging elements which it follows, and ride against the side wall of said furrow so as to aid in guiding the machine. The front furrow wheel 8 is carried by the laterally extending portion 9 of a shank 10 which extends upwardly through a bearing block provided therefor and supported by arms or brackets 11 formed on or secured to the sides of the beam and projecting laterally therefrom. Fitted between the beams or arms 11 is a block 12 which is secured at the desired point in the length of the arms or brackets by bolts inserted through the block and through selected openings 13 provided therefor in the brackets. The wheel 8 may thus be adjusted relative to the wheel 7 so that the machine will be set to the desired distance between successive furrows. The block 12 has an opening therethrough to accommodate the shank 10, and this opening is enlarged in its upper portion whereby to receive a head 14 which fits within the opening and around the shank, as clearly shown, the shank being provided with a longitudinal groove 15 to engage a feather 16 in the bore of the head so that the shank may have vertical movement relative to the head but independent relative rotary movement of the parts will be prevented. The shank is adjusted vertically and held in adjustment by a lever 17 which is fulcrumed on a toothed sector 117 and equipped with a latch 118 engageable with said sector in a well-known manner to hold the lever in a set position. The sector projects rearwardly from a hanger or bracket 119 which is arranged against the rear arm 11 and is equipped at its upper edge with hooks 120 engaging over the arm 11 at the sides of the block 12 whereby it will have a fixed relation to the block. If desired, set bolts may be mounted in the bracket 119 to secure it firmly to the supporting arm. A link 121 is pivoted to and depends from the lever to connect it with an eye-bar 122 having its eye engaged around the shank 10 between stop collars or shoulders 123 thereon so that vertical movement of the lever will be transmitted to the shank and the latter thereby set in the desired position. At the upper end of the shank 10 is secured a cross bar 18 to which a steering pole 19 is attached. The rear shank 5 is adjustable vertically with respect to the sleeve 4 and is held in the set position by stop collars 20 secured to the shank above and below the sleeve, as shown. The upper stop collar is constructed with a radial lug 21 through which a connecting bar 22 extends, the said bar being pivotally held in the lug in any convenient manner. The front end of the connecting bar 22 is pivoted to one end of a lever 23 which is fulcrumed between its ends upon the beam 1 and has its opposite end carrying a pin or stud 24 playing in a longitudinal slot 25 in an arm 26 which is secured in the side of the head 14 and projects inwardly therefrom over the beam 1, as shown clearly in Figs. 2 and 3. If rotation be imparted to the shank 10 by reason of the furrow wheel 8 traveling over irregularities in the wall of the furrow in which it is running, the movement will be transmitted through the described connections to the shank 5 so that said shank will be rotated in the opposite direction and the furrow wheel 7 given a counter adjustment to the shifting of the wheel 8. The machine will thus be caused to respond quickly to variations from a straight line so that the furrow which is being formed will be parallel to the previously formed furrow. This arrangement will also be found very advantageous when the end of the field has been reached and it is desired to turn the machine to plow in the opposite direction inasmuch as by reason of the relative contrary shifting of the two furrow wheels, the plow may be turned in a very small space.

Upon the left side of the beam 1, I secure a supporting bracket 27 in which a rock shaft 28 is mounted. This rock shaft 28 carries a crank 29 and spindle 30 at its outer end, and a wheel 31 is mounted upon the spindle 30 so as to run upon the unplowed surface of the ground. At the inner end of the rock shaft is a crank 32, to the upper end of which a link 33 is attached and the said link is pivoted to a hand lever 34 which may be easily reached by the driver upon the seat 35 so that by properly shifting the lever the wheel 31 may be set to engage the ground at any desired vertical distance below the beam. It will thus be seen that the beam may be readily set at any desired height above the surface of the ground and, consequently, cause the ground-engaging instrumentalities to operate at any desired depth, the machine being especially adapted for deep tilling.

To the right side of the beam, I secure plates 36 to which are hingedly attached the ends of arms 37 and 38 which extend outwardly and respectively rearwardly and forwardly, as shown in Figs. 1 and 2, and have their meeting ends hingedly connected, as shown at 39. The plates 36 are adjustable longitudinally of the beam by fitting the securing bolts 40 through selected openings 41 in the beam, and the arms 37 and 38 may thus be set to bring their hinge connection 39 closer to or farther from the beam for a purpose which will presently appear. Secured to the standard 2 at and near the end of the same are a plurality of supporting rods each comprising a section 42 secured to the standard, a section 43 alined with the section 42, and a connecting sleeve 44 fitting around the meeting ends of the two sections and bridging the joint between them whereby the sections may be set greater or lesser distances apart and, consequently, the effective length of the support varied as may be desired. The sections 42 are turned laterally, as shown at 45, to provide feet which are secured against the side of the standard, and the sections 43 are likewise bent to one side to provide feet 46 which are secured to the rear side of the moldboard 47. The moldboard may thus be set at any desired distance from and angle to the standard according to the nature of the soil, the width of the furrow desired, and other controlling circumstances. To the lower edge of the moldboard is secured a share 48, and the moldboard may be given any desired configuration which will best serve in the particular soil which is being tilled. The forward edge of the moldboard is offset, as shown at 49, to provide a seat for the disk 50 which is of the usual concave form commonly employed in disk plows. A scraper blade 51 is secured to the upper corner of the moldboard 47 and projects over the edge of the disk to the center thereof to bear upon the face of the same and thereby remove any soil which may tend to cling thereto, so that the successful operation of the machine will be assured. The moldboard 47 and share 48 are preferably of such form that they may be briefly described as the rear half of a standard share and moldboard.

The carrying arm 37 is provided near its outer end with a slot 52 which is disposed obliquely, as shown in Fig. 6, so as to extend downwardly and outwardly from its upper end. This slot receives the rear end of a spindle 53 which is provided with a head or enlargement 54 in its intermediate portion and its front end is formed integral with or secured rigidly to the back of the disk 50 at the center of the same, as shown at 55. The disk is formed with a flat rear face 56 concentric with the spindle and bearing against anti-friction balls or like elements 57 arranged in a circular series about the spindle head 54 and arranged in a race 58 formed in a bearing block 59 accommodating the spindle head. Between the block 59 and the arm 37 are disposed plates 60 which meet around the spindle and cover the slot 52. Bolts 61 secure the bearing block 59 and the plates 60 to the supporting arm 37. A stop collar or sleeve 62 is secured upon the rear end of the spindle and bears against the rear side of the arm 37 so that the spindle and the disk will be prevented from dropping forward from the support but may rotate freely.

It is thought the operation of the machine will be readily understood from the foregoing description, taken in connection with the accompanying drawings. Draft is applied to the front end of the beam by draft animals or a tractor and the machine is drawn over the field in the manner now generally practiced in the tilling of the soil. The front furrow wheel 8 is arranged to run in a previously formed furrow while the rear wheel 7 runs behind the disk and the plow 48 in the furrow which is being formed. As the machine proceeds, the disk 50 cuts into the soil and loosens and lifts a portion of the same, the lifted portion passing onto the moldboard by which it is turned. The soil taken up by the stub share 48 also passes onto the moldboard and is turned over with the soil passing from the disk, the turned soil being deposited at the side of the furrow just forming and in the previously formed furrow. The disk is so disposed in the seat 49 of the moldboard that it will run flush with the surface of the moldboard and the forward end of the share 48 is curved so as to fit closely to the edge of the disk, as shown in Fig. 1. The combined action of the disk and the share produces a level or flat bottom to the furrow and by properly adjusting the disk and the share so that it will have a given angular relation to the beam the width of the furrow may be regulated as desired. The angular adjustment of the moldboard and the share will be accomplished by setting the members 42 and 43 so that the effective length of the moldboard supporting arms may be lengthened or shortened, and by setting the spindle 53 at the proper point in the slot 52 the disk 50 may be caused to run at the desired depth. As the disk wears through use, it can be adjusted downwardly and rearwardly so that it will still be flush with the moldboard and share. The adjustment of the supporting arms 37 and 38 is also a factor in determining the width of the furrow and the distance between furrows.

My improved machine embodies all the advantages of the well known breaking and turning plow as well as the advantages of the disk plow and may be drawn over the field with a very light draft. It will be very easily steered and may be operated efficiently in any soil.

Having thus described the invention, I claim:

1. An agricultural machine comprising a beam, carrying arms secured to the beam and converging laterally therefrom, the meeting ends of said arms being hingedly connected, and a turning disk rotatably mounted upon the forward supporting arm.

2. An agricultural machine comprising a beam, supporting arms adjustably secured upon the beam and converging laterally therefrom, and a rotatable turning disk mounted upon the forward supporting arm and adjustable vertically and longitudinally thereof.

3. An agricultural machine comprising a beam, plates adjustably secured to the side of the beam, supporting arms hinged to the said plates and converging outwardly therefrom, the meeting ends of said arms being hingedly connected, and a rotatable turning disk carried by the forward arm near the outer end thereof.

4. An agricultural machine comprising a beam, supporting arms secured upon the side of the beam and extending laterally therefrom, a spindle mounted in the forward arm, and a turning disk carried by the outer end of the spindle.

5. An agricultural implement comprising a beam, a standard at the rear end of the beam, a plow share and moldboard disposed in laterally spaced relation to the standard, and extensible connecting arms secured to the standard and to the rear side of the moldboard.

6. An agricultural machine comprising a beam, a standard at the rear end of the beam, a turning disk, means carried by the beam for supporting the turning disk in advance of the standard, a plow share and moldboard arranged adjacent the turning disk at the rear thereof and constructed with a seat receiving the edge portion of the disk, and adjustable supporting arms secured to and extending between the moldboard and the standard.

In testimony whereof I affix my signature.

THOMAS M. THOMPSON. [L. S.]